(12) United States Patent
Koizumi et al.

(10) Patent No.: US 9,780,560 B2
(45) Date of Patent: Oct. 3, 2017

(54) DC POWER SUPPLY SYSTEM AND CONTROL METHOD

(75) Inventors: Tomonari Koizumi, Tokyo (JP); Yasuo Masuda, Tokyo (JP); Yusuke Kubota, Tokyo (JP); Akiyoshi Fukui, Tokyo (JP); Akira Matsumoto, Tokyo (JP)

(73) Assignees: Origin Electric Company, Limited, Saitama (JP); NTT FACILITIES, INC., Tokyo (JP)

( * ) Notice: Subject to any disclaimer, the term of this patent is extended or adjusted under 35 U.S.C. 154(b) by 1081 days.

(21) Appl. No.: 13/996,779

(22) PCT Filed: Dec. 22, 2011

(86) PCT No.: PCT/JP2011/079889
§ 371 (c)(1),
(2), (4) Date: Jun. 21, 2013

(87) PCT Pub. No.: WO2012/086788
PCT Pub. Date: Jun. 28, 2012

(65) Prior Publication Data
US 2013/0278056 A1   Oct. 24, 2013

(30) Foreign Application Priority Data
Dec. 24, 2010 (JP) ................. 2010-288746

(51) Int. Cl.
*H02J 1/00* (2006.01)
*H02J 7/00* (2006.01)
*H02J 7/04* (2006.01)

(52) U.S. Cl.
CPC .............. *H02J 1/00* (2013.01); *H02J 7/0068* (2013.01); *H02J 7/045* (2013.01); *Y10T 307/305* (2015.04)

(58) Field of Classification Search
CPC .... H02J 9/062; H02J 9/061; H02J 9/06; H02J 7/34; H02J 1/00; H02J 7/0068; H02J 7/045; G06F 1/30; Y10T 307/305
(Continued)

(56) References Cited

U.S. PATENT DOCUMENTS 4,779,050 A    10/1988  Ohnari
6,111,764 A *   8/2000  Atou .................. H02J 9/062
                                          307/66
(Continued)

FOREIGN PATENT DOCUMENTS

CN          1885672       12/2006
JP      05-199674 A       8/1993
(Continued)

OTHER PUBLICATIONS

International Preliminary Report on Patentability dated Jul. 4, 2013 corresponding to patent application No. PCT/JP2011/079889; 6 pages.

(Continued)

*Primary Examiner* — Thienvu Tran
*Assistant Examiner* — Brian K Baxter
(74) *Attorney, Agent, or Firm* — Ohlandt, Greeley, Ruggiero & Perle, L.L.P.

(57) ABSTRACT

A DC power supply system and a control method, which can continue charging of a storage battery with a constant current even if an assist current is needed due to, for example, overload during charging of the storage battery and can suppress a current output from the storage battery as much as possible. In a power supply system, when a charger operates at a potential of an output voltage smaller than the potential of the output voltage of a rectifier during charging of the storage battery, the output current of the charger is controlled so that a charging current Ie supplied from the (Continued)

charger to the storage battery is kept at a predetermined value, and when a load requires a current larger than the current supplied by the rectifier during charging of the storage battery, the potential of the output voltage of the rectifier is reduced smaller than the potential of the output voltage of the charger by a current drooping operation, and the diode is electrically connected, the output current of the charger is controlled so that the charger outputs the assistant current Ic supplied toward the load while the charging current Ie is kept at a predetermined value.

10 Claims, 10 Drawing Sheets

(58) Field of Classification Search
  USPC .......................................................... 307/66
  See application file for complete search history.

(56) References Cited

U.S. PATENT DOCUMENTS

| | | | | |
|---|---|---|---|---|
| 8,154,257 | B2* | 4/2012 | Hori | H01M 10/441 320/126 |
| 8,228,043 | B2* | 7/2012 | Wolf | G06F 1/26 307/32 |
| 2001/0050547 | A1* | 12/2001 | Takimoto | H02J 7/022 323/284 |
| 2007/0229028 | A1* | 10/2007 | Hashimoto | H02J 7/022 320/114 |
| 2008/0136264 | A1* | 6/2008 | Yoshida | H02J 7/0052 307/80 |
| 2008/0252144 | A1* | 10/2008 | Wang | H02J 9/062 307/66 |
| 2009/0001937 | A1* | 1/2009 | Densham | H02J 7/00 320/145 |
| 2009/0309547 | A1* | 12/2009 | Nakatsuji | H01M 10/441 320/134 |
| 2009/0322287 | A1* | 12/2009 | Ozeki | H02J 7/0018 320/145 |
| 2010/0019735 | A1* | 1/2010 | Hori | H01M 10/441 320/162 |
| 2010/0156355 | A1* | 6/2010 | Bauerle | B60L 3/003 320/145 |
| 2010/0244783 | A1* | 9/2010 | Wolf | G06F 1/26 320/162 |
| 2011/0006731 | A1* | 1/2011 | Wang | B60L 11/1816 320/109 |

FOREIGN PATENT DOCUMENTS

| | | |
|---|---|---|
| JP | 2006-158103 A | 6/2006 |
| JP | 2009-296713 A | 12/2009 |
| WO | 2006136100 | 12/2006 |

OTHER PUBLICATIONS

International Search Report dated Apr. 17, 2012 for corresponding International Patent Application No. PCT/JP2011/079889 with English translation (2 pages).

Chinese Office Action dated Jan. 20, 2015 corresponding to Chinese Application No. 201180061702.5; 19 pages.

* cited by examiner

DC POWER SUPPLY SYSTEM AND CONTROL METHOD

BACKGROUND

1. Field of the Disclosure

This disclosure relates to a DC power supply system, which is provided with a rectifier and a charger, and a control method thereof.

2. Discussion of the Background Art

There has been known a DC backup power supply system which charges a storage battery while supplying a DC current to a load (for example, see Japanese Patent Application Laid-Open No. 2009-296719).

In general, in order to extend a life of a storage battery, it is preferable that the storage battery is charged at a constant current and an electric current is prevented from being output from the storage battery as much as possible. In the DC backup power supply system disclosed in Japanese Patent Application Laid-Open No. 2009-296719, an output current output from a charger is controlled to be kept constant until an output voltage of a storage battery reaches a predetermined value during charging of the storage battery. Thus, in the DC backup power supply system disclosed in Japanese Patent Application Laid-Open No. 2009-296719, when an assist current is required to be supplied from the storage battery to a load due to, for example, overload during charging of the storage battery, there is a problem that the storage battery cannot be charged with a constant current.

SUMMARY

In order to solve the above problem, an object of this disclosure is to provide a DC power supply system and a control method, which can continue charging of a storage battery with a constant current even if an assist current is needed due to, for example, overload during charging of the storage battery and can suppress a current output from the storage battery.

Means for Solving the Problems

In order to achieve the above object, in a DC power supply system and a control method according to this disclosure, when an assist current is required to be supplied to a load due to, for example, overload, a charger continues charging of a storage battery with a constant current and, at the same time, supplies the assist current to the load.

More specifically, the DC power supply system according to this disclosure is provided with a rectifier which converts AC power into DC power and supplies the DC power to a load through a feeder, a semiconductor device which connects a storage battery and the feeder to each other and is electrically connected when an electric current is supplied from the storage battery side toward the load side, a charger which charges the storage battery, and a controller which controls an output current of the charger so that a charging current supplied from the charger to the storage battery is kept at a predetermined value when the charger operates at a potential of an output voltage smaller than the potential of the output voltage of the rectifier during charging of the storage battery, and controls an output current of the charger so that the charger outputs an assist current supplied toward the load while the charging current is kept at the predetermined value when the load requires an electric current larger than the electric current supplied by the rectifier during charging of the storage battery, the potential of the output voltage of the rectifier is reduced smaller than the potential of the output voltage of the charger by a current drooping operation, and the semiconductor device is electrically connected.

The control method for a DC power supply system according to this disclosure is a control method for a DC power supply system including: a rectifier which converts AC power into DC power and supplies the DC power to a load through a feeder, a semiconductor device which connects a storage battery and the feeder to each other and is electrically connected when an electric current is supplied from the storage battery side toward the load side, and a charger which charges the storage battery, the control method, wherein an output current of the charger is controlled so that a charging current supplied from the charger to the storage battery is kept at a predetermined value when the charger operates at a potential of an output voltage smaller than the potential of the output voltage of the rectifier during charging of the storage battery, and an output current of the charger is controlled so that the charger outputs an assist current supplied toward the load while the charging current is kept at the predetermined value when the load requires an electric current larger than the electric current supplied by the rectifier during charging of the storage battery, the potential of the output voltage of the rectifier is reduced smaller than the potential of the output voltage of the charger by a current drooping operation, and the semiconductor device is electrically connected.

In the DC power supply system, when the electric current required by the load is larger than a supply current from the rectifier, the output current of the charger is increased or reduced according to the magnitude of the electric current required by the load, whereby the charger can supply the assist current while keeping the charging current constant. Accordingly, this disclosure can provide the DC power supply system, which can continue charging of the storage battery with a constant current even if the assist current is needed due to, for example, overload during charging of the storage battery and can suppress the current output from the storage battery, and the control method.

The controller of the DC power supply system according to this disclosure controls the output current of the charger so that the charger outputs the assist current when the load requires the electric current larger than the electric current supplied by the rectifier when the storage battery is fully charged, the potential of the output voltage of the rectifier is reduced smaller than the potential of the output voltage of the charger by the current drooping operation, and the semiconductor device is electrically connected.

In the control method for a DC power supply system according to this disclosure, the output current of the charger is controlled so that the charger outputs the assist current when the load requires the electric current larger than the electric current supplied by the rectifier when the storage battery is fully charged, the potential of the output voltage of the rectifier is reduced smaller than the potential of the output voltage of the charger by the current drooping operation, and the semiconductor device is electrically connected.

This disclosure can provide a DC power supply system and a control method, which, even if an assist current is needed when a storage battery is fully charged, can suppress a current output from the storage battery by the assist current output from a charger.

The controller of the DC power supply system according to this disclosure changes an output current setting value of the charger with the using of the current drooping operation of the charger during charging of the storage battery and thereby controls the output current of the charger so that the charging current is kept at the predetermined value.

In the control method for a DC power supply system according to this disclosure, the output current setting value of the charger is changed by the using of the current drooping operation of the charger during charging of the storage battery and whereby the output current of the charger is controlled so that the charging current is kept at the predetermined value.

While the output current setting value of the charger is adjusted to keep the charging current supplied to the storage battery constant, the current drooping operation is used.

The controller of the DC power supply system according to this disclosure confirms the charging current supplied to the storage battery when the output current setting value of the charger exceeds the upper limit, and terminates the charge control when the charging current is not more than a previously determined design value or continues the charge control when the value of the charging current is more than the design value.

In the control method for the DC power supply system according to this disclosure, the charging current supplied to the storage battery is confirmed when the output current setting value of the charger exceeds the upper limit, and the charge control is terminated when the charging current is not more than a previously set design value, or the charge control is continued when the charging current is more than the design value.

When a constant power is supplied to a load, it is possible to avoid an unstable operation situation in which the DC power supply system repeats the start and termination of the charge control.

The controller of the DC power supply system according to this disclosure sets the output current setting value of the charger to a rated current value and allows the charger to wait when the controller terminates the charge control because the storage battery is fully charged.

In the control method for the DC power supply system according to this disclosure, the output current setting value of the charger is set to a rated current value and the charger is allowed to wait when the charge control is terminated because the storage battery is fully charged.

Since the assist current is immediately supplied from the charger to the load according to need, the reliability of the DC power supply system can be enhanced. Moreover the current output from the storage battery can be suppressed.

Effects of the Disclosure

This disclosure can provide a DC power supply system and a control method, which can continue charging of a storage battery with a constant current even if an assist current is needed due to, for example, overload during charging of the storage battery and can suppress a current output from the storage battery.

DETAILED DESCRIPTION OF THE PREFERRED EMBODIMENT

Embodiments of the present disclosure are described with reference to the attached drawings. The embodiments hereinafter described are examples of the present disclosure, and the present disclosure is not limited to the following embodiments. Meanwhile, components to which an identical reference numeral is assigned in this description and the drawings are identical to each other.

Figure 1:
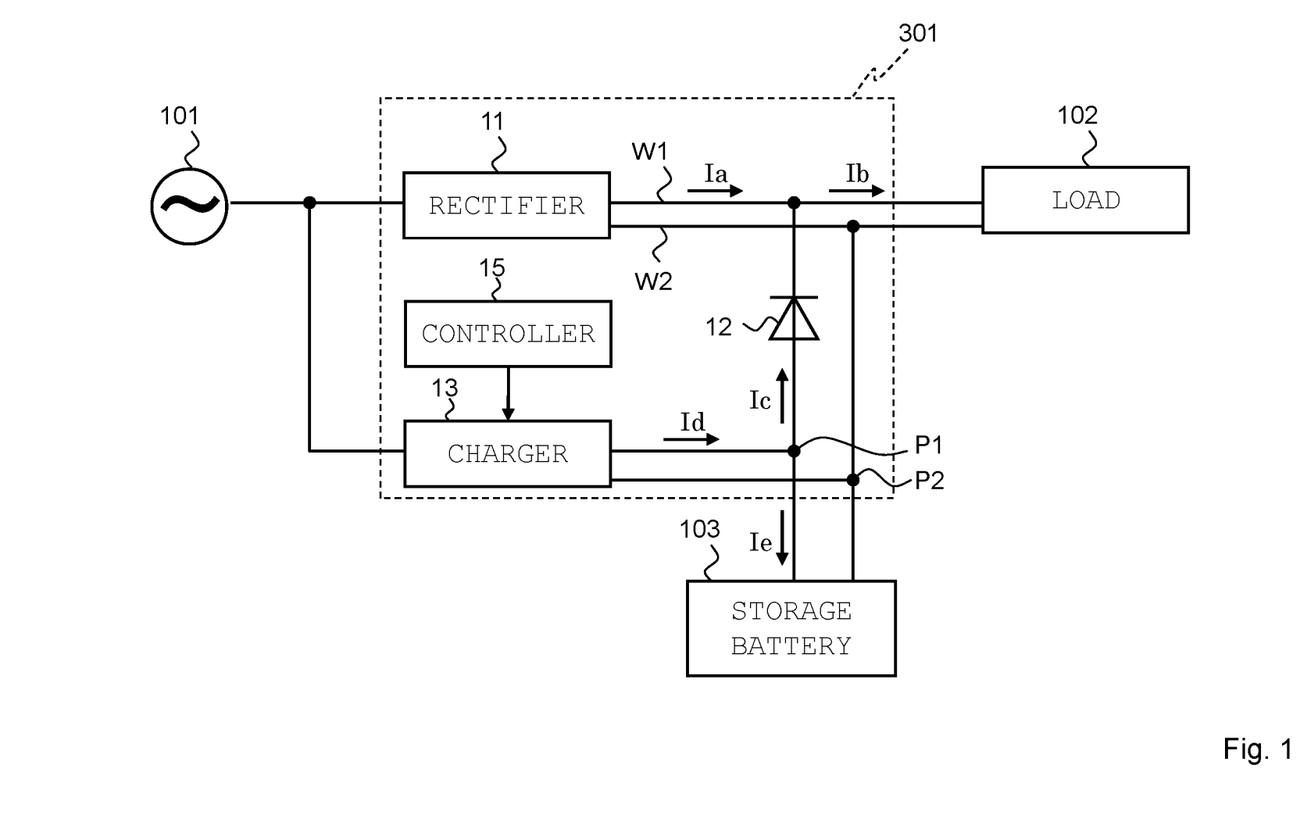
FIG. 1 is a block diagram for explaining a DC power supply system according to the present disclosure.

FIG. 1 is a block diagram for explaining a DC power supply system 301 according to the present embodiment. The DC power supply system 301 is provided with a rectifier 11 which converts AC power from an AC source 101 into DC power and supplies the DC power to a load 102 through feeders W1 and W2, a semiconductor device 12 which connects a storage battery 103 and the feeder W1 to each other and is electrically connected when an electric current is supplied from the storage battery 103 side toward the load 102 side, a charger 13 which charges the storage battery 103, and a controller 15 which controls an output current of the charger 13 so that a charging current Ie supplied from the charger 13 to the storage battery 103 is kept at a predetermined value when the charger 13 operates at a potential of an output voltage smaller than the potential of the output voltage of the rectifier 11 during charging of the storage battery 103, and controls, when the load 102 requires an electric current larger than the electric current supplied by the rectifier 11 during charging of the storage battery 103, the potential of the output voltage of the rectifier 11 is reduced smaller than the potential of the output voltage of the charger 13 by a current drooping operation, and the semiconductor device 12 is electrically connected, an output current Id of the charger 13 so that the charger 13 outputs an assist current Ic supplied toward the load 102 while the charging current Ie is kept at the predetermined value. A plurality of the rectifiers 11 and the chargers 13 may be provided. The predetermined value of the charging current Ie is an optimum charging current value X of the storage battery 103 and can be calculated from the capacity of the storage battery 103. For example, in FIG. 1, the voltage value of the feeder W1 is a positive value, and the feeder W2 is a ground line.

Figure 4:
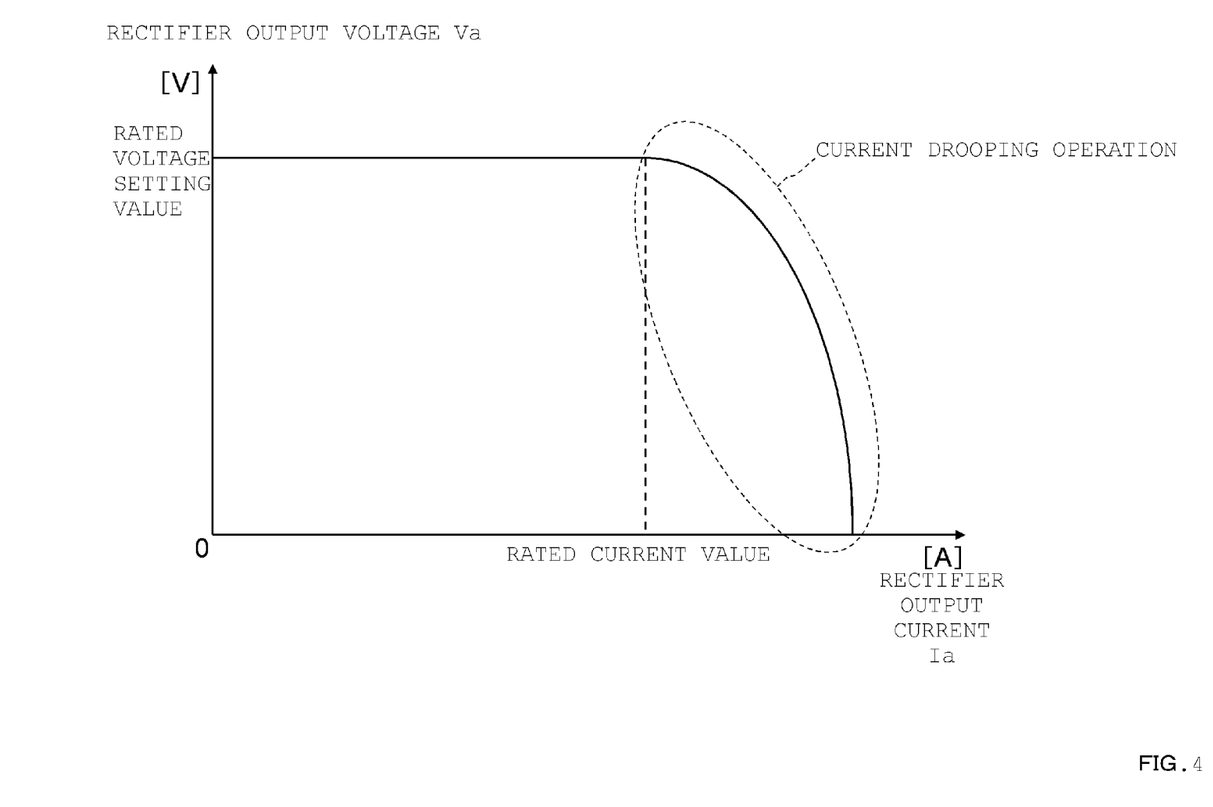
FIG. 4 is a view for explaining the current drooping operation of a rectifier.

When an electric current needed by the load 102 exceeds a rated current value, the rated current being an electric current that can be supplied by the rectifier 11, that is, when overcurrent occurs, the rectifier 11 performs a current drooping operation shown in FIG. 4. In the rectifier 11, although the output voltage is a constant output voltage when the value of the output current Ia is in a range of 0 to a rated current value, when the output current Ia exceeds the rated current value, the output voltage Va is reduced from a rated voltage value.

Figure 3:
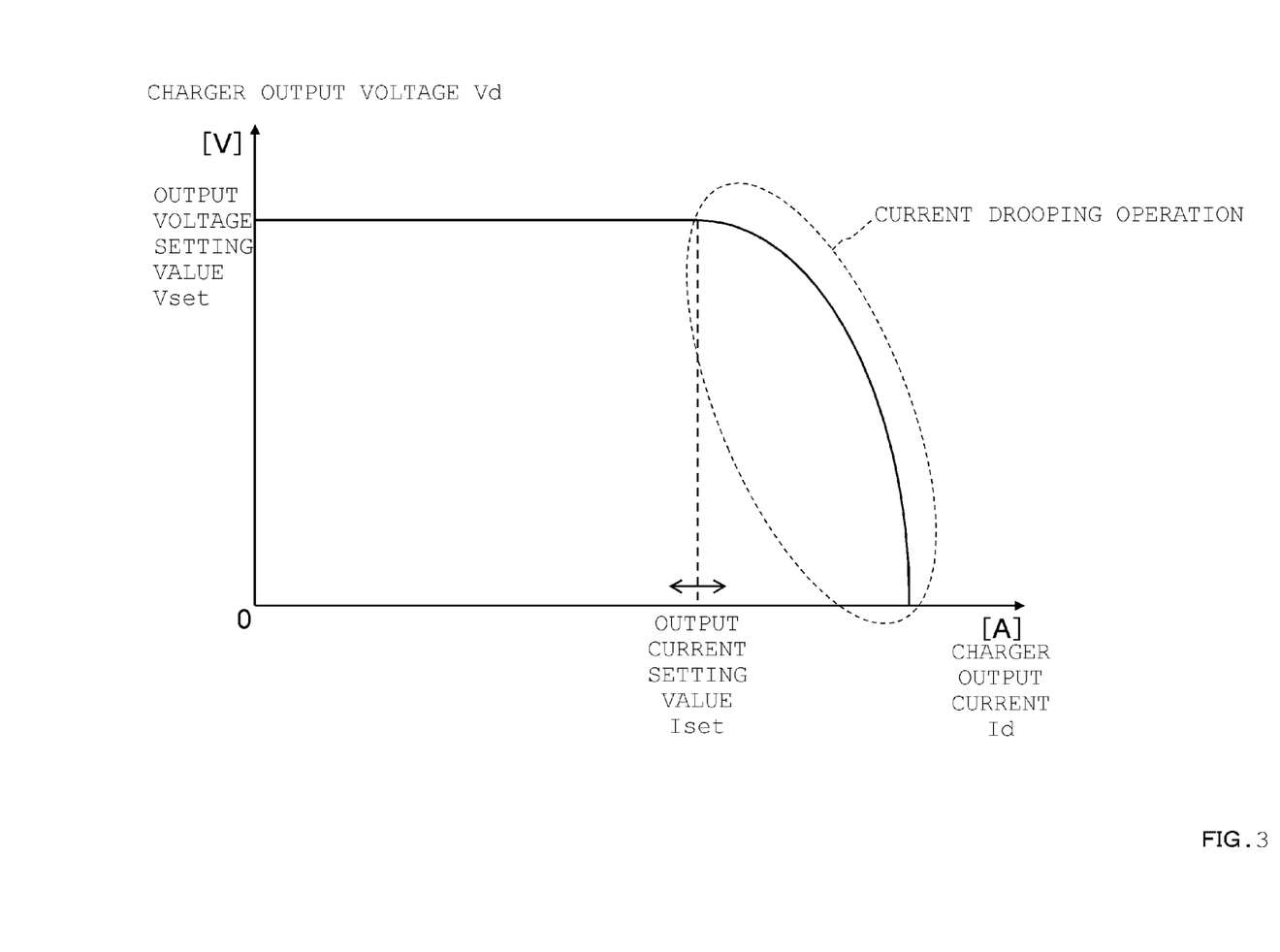
FIG. 3 is a view for explaining a current drooping operation of the charger.

When the required current exceeds an output current setting value Iset, the charger 13 performs the current drooping operation shown in FIG. 3. In the charger 13, although the output voltage Vd is the setting output voltage Vset when the value of the output current Id is in a range of the output current setting value 0 to Iset, when the output current Id exceeds the output current setting value Iset, the output voltage Vd is reduced lower than Vset. The output current setting value Iset is variable.

For example, the semiconductor device 12 is a diode which is electrically connected when an electric current is supplied from the storage battery 103 side toward the load 102 side. In the following description, the semiconductor device 12 is a diode 12. In FIG. 1, since the voltage value of the feeder W1 is a positive value, the anode of the diode 12 is connected toward a connecting point P1 side between the charger 13 and the storage battery 103. When the diode 12 is electrically connected, the assist current Ic is flowed from the charger 13 by a closed loop formed through the diode 12, the load 102, and the charger 13. Any semiconductor device may be used as long as the closed loop through which an electric current flows from the charger 13 to the load 102 when the assist current flows is formed, and the semiconductor device 12 is not limited to the diode.

For example, the controller 15 changes the output current setting value Iset of the charger 13 with the using of the current drooping operation of the charger 13 during charging of the storage battery 103 and thereby controls the output current Id of the charger 13 so that the charging current Ie is kept at the predetermined value.

The DC power supply system 301 performs the following operation at a normal time, an assist time, and a fully charged time.

[Normal Time]

The normal time is a time when the electric current required by the load 102 is smaller than the electric current that can be supplied by the rectifier 11. At the normal time, the charger is operated by a potential of an output voltage smaller than the potential of the output voltage of the rectifier 11. Since the output voltage Va of the rectifier 11 is set higher than the output voltage Vd of the charger 13, that is, the voltage at the connecting point P1, the diode 12 is not electrically connected at the normal time. Since the closed loop through which the electric current flows from the charger 13 to the load 102 is not formed, the value of the assist current Ic flowing from the charger 13 to the load 102 is 0. Namely, only the rectifier 11 supplies the electric current to the load 102, and the output current Ia of the rectifier 11 is equal to the load current Ib required by the load 102. Meanwhile, when the storage battery 103 is required to be charged, the charger 13 charges the storage battery 103 with the charging current Ie. At the normal time, since the assist current Ic=0, the output current Id of the charger 13 and the charging current Ie are equal to each other.

Figure 5:
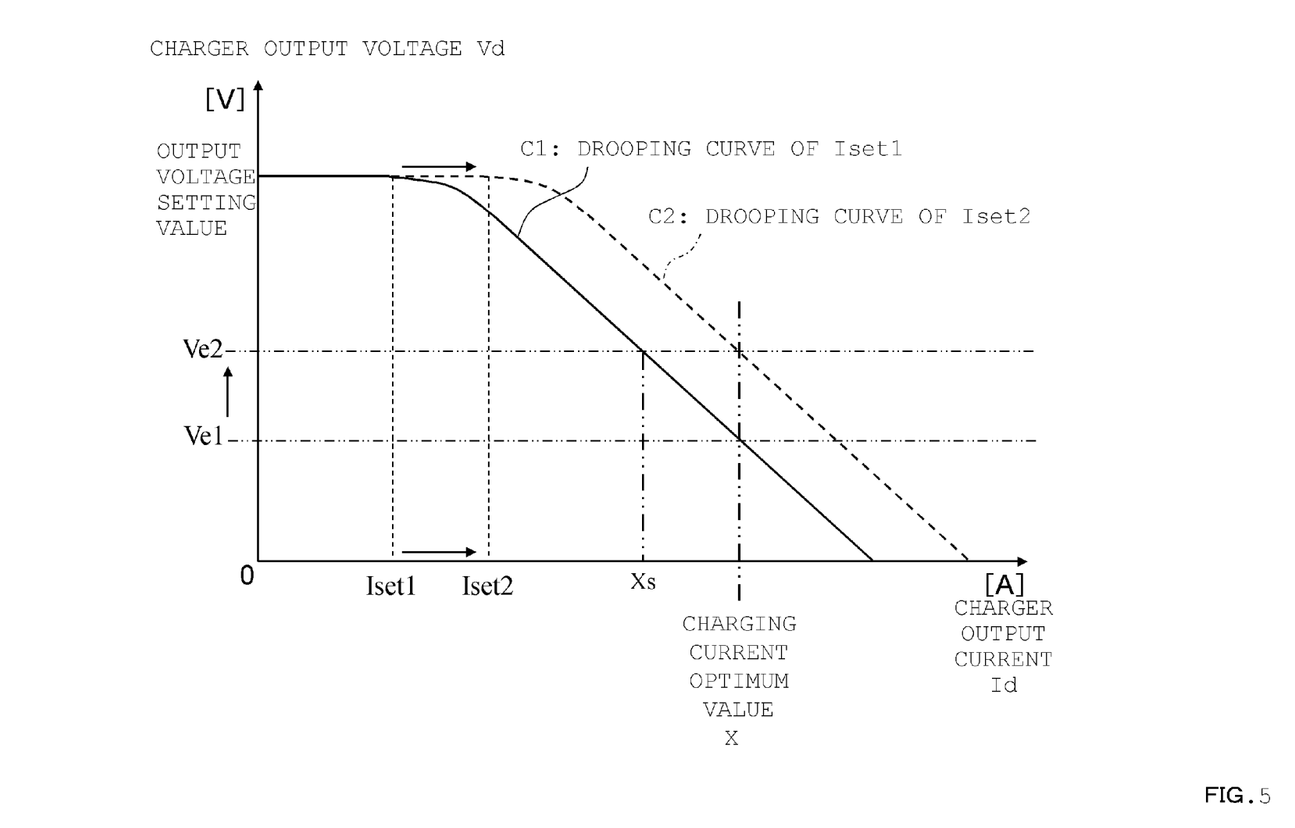
FIG. 5 is a view for explaining an operation of a controller at a normal time.

A specific operation of the controller 15 at the normal time will be described in more detail using FIG. 5. FIG. 5 is a view for explaining a relationship between the output voltage Vd and the output current Id of the charger 13 at the normal time. At the normal time, the controller 15 operates the charger 13 in a current drooping operation region and adjusts the output current setting value Iset to thereby control the output current Id of the charger 13.

C1 of FIG. 5 is a drooping curve when the output current setting value of the charger 13 is Iset1, and C2 is a drooping curve when the output current setting value of the charger 13 is Iset2. When the output voltage Vd of the charger 13 is Ve1 smaller than the output voltage setting value, if the output current setting value is Iset1, the output current Id of the charger 13 is a charging current optimum value X according to the drooping curve C1 of Iset1. However, the storage battery 103 is gradually charged, and as the voltage of the storage battery 103 increases, the output voltage Vd of the charger 13 connected to the storage battery 103 also increases. For example, when the voltage of the storage battery 103 increases from Ve1 to Ve2, if the output current setting value is kept at Iset1, the output current Id of the charger 13 becomes an electric current Xs smaller than the charging current optimum value X according to the drooping curve C1 of Iset1. Thus, the output current setting value is increased from Iset1 to Iset2, and the drooping curve C2 of Iset2 is used, whereby the output current Id of the charger 13 can be made the charging current optimum value X. The voltage of the storage battery 103 thus increases to increase the output voltage Vd of the charger 13, and even if the value of the output current Id of the charger 13 is reduced smaller than the charging current optimum value X accompanying this, the output current setting value Iset is changed to move the drooping curve, whereby the value of the output current Id of the charger 13 can be kept at the charging current optimum value X which is a predetermined value.

[Assist Time]

The assist time is a time when the current value required by the load 102 exceeds the current value that can be output by the rectifier 11 due to a malfunction of the rectifier 11 or an increase in the load 102 and so on. When the load current Ib increases larger than the electric current that can be output by the rectifier 11, the output voltage Va of the rectifier 11 is reduced by the current drooping operation of the rectifier 11. When the potential of the output voltage of the rectifier 11 is reduced smaller than the potential of the output voltage of the charger 13 by the current drooping operation and the voltage at the connecting point P1 increases higher than the output voltage Va of the rectifier 11, the diode 12 is electrically connected. When the diode 12 is electrically connected, the closed loop through which the electric current flows from the charger 13 to the load 102 is formed, and therefore, the assist current Ic corresponding to an under current flows from the charger 13 to the load 102.

The output current Id of the charger 13 is in a relationship in which output current Id=charging current Ie+assist current Ic. When the controller 15 detects reduction in the charging current Ie, for example based on the flowing of the assist current Ic, the controller 15 flows the assist current Ic and, at the same time, instructs the output current Id so that the value of the charging current Ie is the charging current optimum value X that is a predetermined value. Even if the assist current Ic flows, the charging current Ie can be kept constant by increasing the output current Id of the charger 13. Since the load current Ib varies, the assist current Ic varies according to this.

Figure 6:
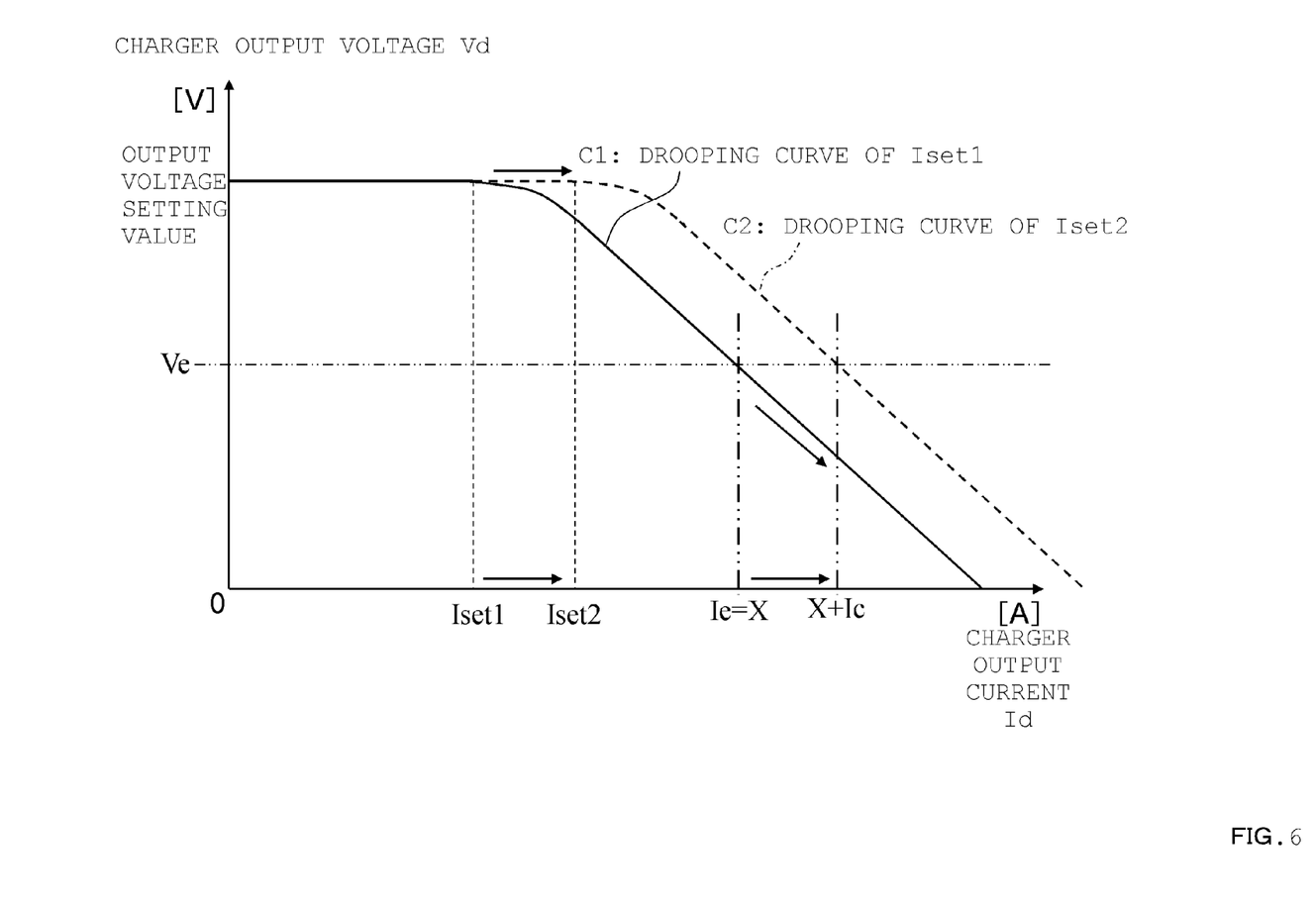
FIG. 6 is a view for explaining the operation of the controller at an assist time.

A specific operation of the controller 15 at the assist time will be described in more detail using FIG. 6. FIG. 6 is a view for explaining a relationship between the output voltage Vd and the output current Id of the charger 13 at the assist time. At the assist time, the controller 15 operates the charger 13 in the current drooping operation region and adjusts the output current setting value Iset to thereby control the output current Id of the charger 13.

In the charger 13, when the value of the output current Id is the charging current Ie, that is, the charging current optimum value X and the output voltage Vd is Ve according to the drooping curve C1 of the output current setting value Iset1, if the assist current Ic is generated or increases, the value of the charging current Ie supplied from the output current Id is reduced smaller than the charging current optimum value X. Thus, when the controller 15 detects the reduction in the charging current Ie, for example, the controller 15 increases the output current setting value Iset of the charger 13 so that Iset1→Iset2 such that the electric current corresponding to the assist current Ic can be supplied while the charging current Ie in which the value of the output current Id is the charging current optimum value X is flowed. In the charger 13, the output voltage Vd is Ve according to the drooping curve C2 of Iset2, and the charger 13 can supply the output current Id in which the charging current optimum value X of the charging current Ie and the assist current Ic are combined with each other. Thus, in the DC power supply system 301, the value of the charging current Ie can be kept constant at the charging current optimum value X at the assist time.

Conversely, a case where the assist current Ie is reduced will be described. When the output current Id is charging current optimum value X+assist current Ic and the output voltage Vd is Ve according to the drooping curve C2 of Iset2, if the assist current Ic is reduced, the value of the charging current Ie flowing from the output current Id increases larger than the charging current optimum value X. Thus, in the controller 15, for example when the controller 15 detects the increase in the charging current Ie, the output current setting value Iset of the charger 13 is reduced, whereby the output voltage Vd is Ve, and the output current Id in which the charging current optimum value X of the charging current Ie and the assist current Ic are combined with each other can be supplied. Thus, in the DC power supply system 301, the charging current Ie can be kept constant at the charging current optimum value X when the assist current Ic is reduced as in the case in which the assist current Is is generated or increases.

In the DC power supply system 301, when the storage battery 103 is charged, the assist current Ic corresponding to the electric current lacking in supply from the rectifier 11 can be supplied using the charger 13, and therefore, the reliability of the entire apparatus can be enhanced. At this time, since the electric current from the storage battery 103 to the load 102 is not supplied, discharge of the storage battery 103 can be suppressed. Moreover since the value of the charging current Ie is kept at the constant charging current optimum value X when the assist current Ic is supplied, the life of the storage battery 103 can be extended.

Figure 2:
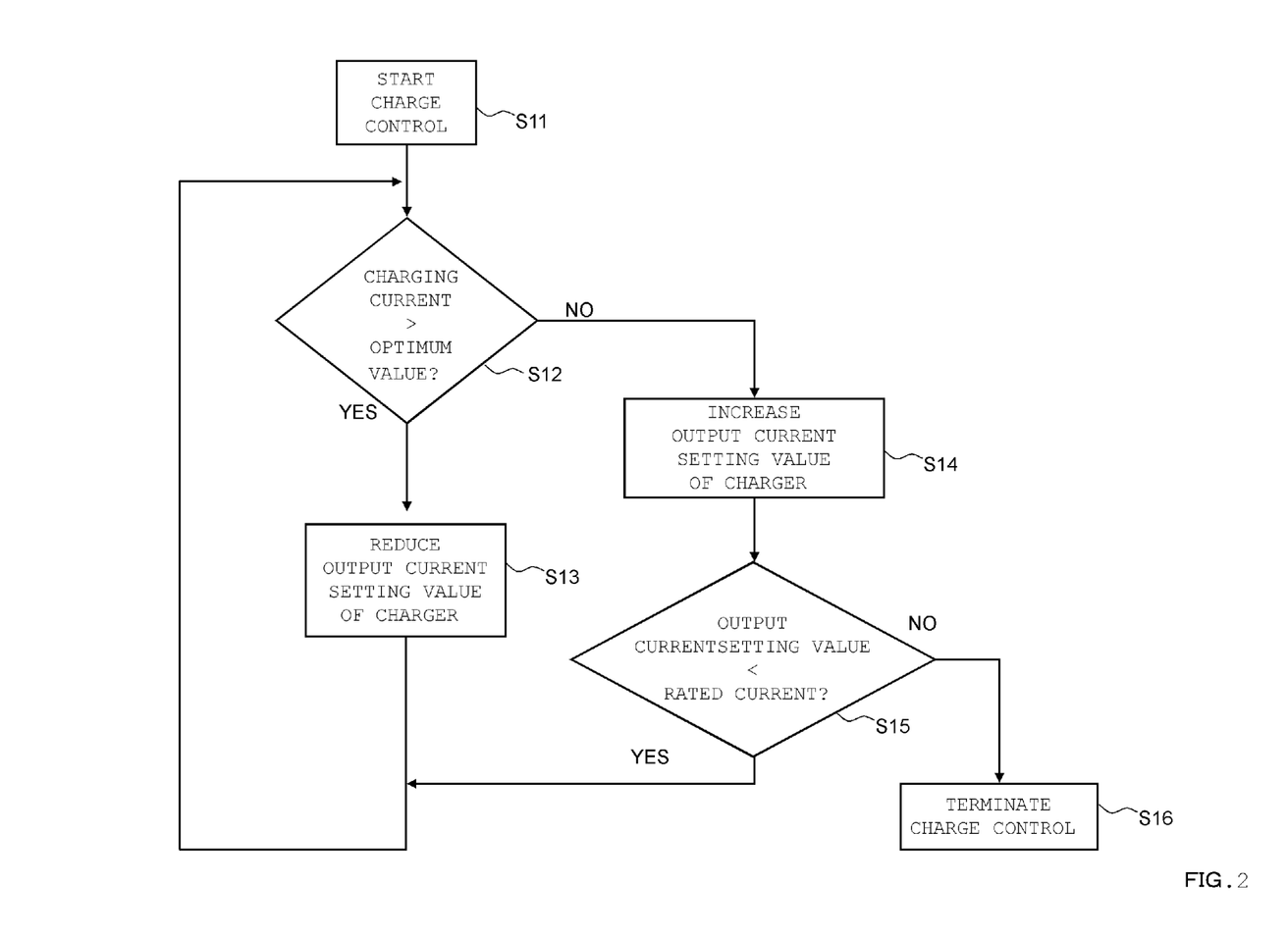
FIG. 2 is a control flow of a charger performed by the DC power supply system according to the disclosure.

FIG. 2 is a view for explaining a control flow of the charger 13 performed by the controller 15 at the normal time and the assist time. The controller 15 starts a charge control (step S11) and then compares the charging current Ie and the charging current optimum value X (step S12). For example, when the flowing assist current Ic is reduced and Ie>X, the controller 15 reduces the output current setting value Iset of the charger 13 (step S13). Since the charger 13 outputs the output current Id of the reduced output current setting value, the value of the charging current Ie approaches the charging current optimum value X.

When the assist current Ic starts to flow and Ie≤X, the controller 15 increases the output current setting value of the charger 13 (step S14). Since the charger 13 outputs the output current Id of the increased output current setting value, the charging current Ie approaches the charging current optimum value X.

After that, the controller 15 compares the output current setting value Iset of the charger 13 and the rated current value Z (step S15). If Iset≥Z in step S15, the controller 15 terminates the charge control and charges the storage battery 103 in a state of being the output current setting value Iset set in the charger 13 (step S16). After step S13 or when Iset<Z in step S15, the controller 15 returns to step S12 and compares the charging current Ie and the charging current optimum value X again.

[Fully Charged Time]

For example when the value of the charging current Ie is reduced smaller than the charging current optimum value X which is a predetermined value, the controller 15 judges that the storage battery 103 approaches the fully charged state, and the charge control is terminated. When the storage battery 103 is fully charged, although the output current setting value Iset is set in the charger 13, output current Id=charging current Ie=0.

When the storage battery 103 is fully charged, in a case where the load 102 requires the electric current larger than the electric current supplied by the rectifier 11, the potential of the output voltage of the rectifier 11 is reduced smaller than the potential of the output voltage of the charger 13 by the current drooping operation, and the diode 12 is electrically connected, the controller 15 controls the output current Id of the charger 13 so that the charger 13 outputs the assist current Ic.

When the load current Ib increases larger than the electric current which can be output by the rectifier 11, if the potential of the output voltage of the rectifier 11 is reduced smaller than the potential of the output voltage of the charger 13 by the current drooping operation and the voltage at the connecting point P1 becomes higher, the diode 12 is electrically connected. Thus, the assist current Ic is output from the charger 13 toward the load 102. Even if the assist current Ic is needed when the storage battery 103 is fully charged, the charger 13 outputs the assist current Ic, whereby the current output from the storage battery 103 can be suppressed.

After the charge control is terminated because the storage battery 103 is fully charged, the output current setting value of the charger 13 is set to a rated current value, and the charger 13 is allowed to wait, so that the assist current Ic can be immediately flowed from the charger 13 to the load 102 according to need. When the storage battery 103 is fully charged, the electric current corresponding to the electric current lacking in supply from the rectifier 11 can be supplied using the charger 13, and therefore, the reliability of the DC power supply system 301 can be enhanced. Moreover, since the current output from the storage battery 103 can be suppressed, the life of the storage battery 103 can be extended.

In the present embodiment, although the charging current Ie is used, since there is a relationship of Id=Ie+Ic, even if the charging current Ie is calculated from the assist current Ic and the output current Id, the control described in the DC power supply system 301 can be performed.

In a typical DC power supply system, when a plurality of the rectifiers 11 are connected in parallel according to a load, in order to enhance the reliability, a redundant configuration such as provision of spare equipment corresponding to malfunctions is adopted. In the DC power supply system 301 according to this disclosure, since the electric current corresponding to the electric current lacking in supply from the rectifier 11 can be supplied using the charger 13, even in the case where there is not adopted a redundant configuration in which the charger 13 serves as spare equipment and an extra rectifier is provided, compactness of the entire apparatus and reduction in cost can be realized without lowering the reliability.

In the DC power supply system and the control method thereof according to this disclosure, although the voltage value of the feeder W1 described above is positive, the voltage value of the feeder W1 may be negative. In FIG. 1, when the voltage value of the feeder W1 is negative, the cathode side of the diode 12 is connected toward the connecting point P1 between the charger 13 and the storage battery 103, whereby this constitution is substantially similar to the above embodiment, including the case where the storage battery 103 is fully charged. With regard to the electric currents and the directions of the electric currents in this case, the rectifier output current Ia and the load current Ib flow toward the load 102 through the feeder W2, the output current Id of the charger 13 flows from the charger 13 toward the connecting point P2, the assist current Ic flows from the connecting point P2 toward the load 102 through the feeder W2, and the charging current Ie flows from the connecting point P2 toward the storage battery 103. Namely, in FIG. 1, when the diode 12 is electrically connected, the assist current Ic flows from the charger 13 by a closed loop formed through the load 102, the diode 12, and the charger 13. In the description of the operation using FIGS. 3 to 6, if the voltage values of the rectifier 11, the charger 13, the storage battery 103, and the connecting point P1 and the values of the output voltage Va, the output voltage Vd, and so on are absolute values, the operation is similar to the description of the above embodiment.

The case where the voltage value of the feeder W1 is negative will be described using FIG. 1 as in the case where the voltage value of the feeder W1 is positive. In the DC power supply system 301, when the charger 13 operates at the potential of the output voltage smaller than the potential of the output voltage of the rectifier 11 during charging of the storage battery 103, the output current of the charger 13 is controlled so that the charging current supplied from the charger 13 to the storage battery 103 is kept at a predetermined value. Further, the load 102 requires an electric current larger than the electric current supplied by the rectifier 11 during charging of the storage battery 103, and when the potential of the output voltage of the rectifier 11 is reduced smaller than the potential of the output voltage of the charger 13 by the current drooping operation and the diode 12 is electrically connected, the output current Id of the charger 13 is controlled so that the charger 13 outputs the assist current Ic supplied toward the load 102 while the charging current Ie is kept at a predetermined value. In this DC power supply system, charging of the storage battery can be continued with a constant current even if the assist current is needed due to, for example, overload during charging of the storage battery, and the current output from the storage battery can be suppressed.

Other Embodiments

Figure 10:
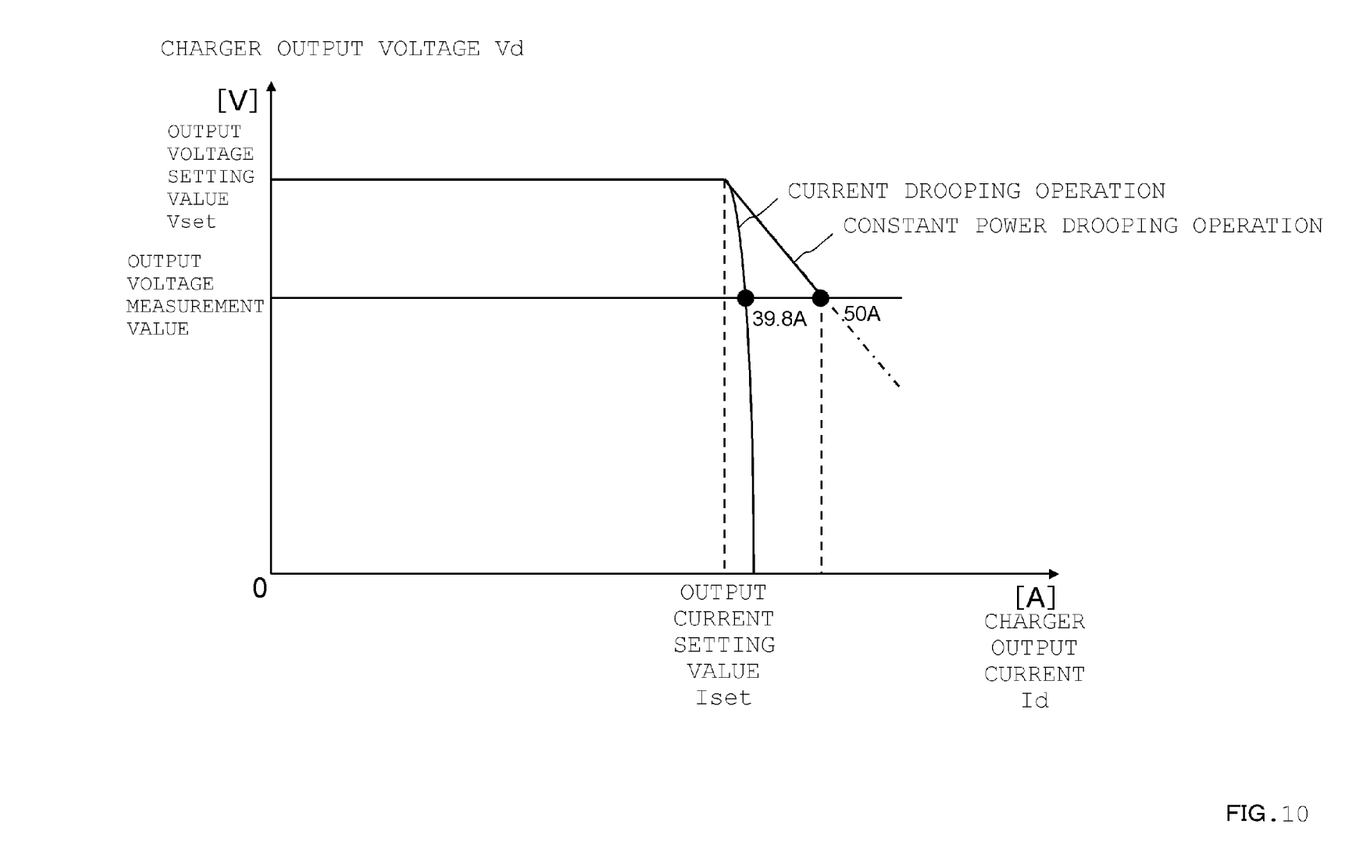
FIG. 10 is a view for explaining the current drooping operation and a constant power drooping operation of the charger.

A constant power may be required to be supplied according to the kind of a load. In such a case, a DC power supply system 301 is required to have a rectifier 11 and a charger 13 performing a constant power drooping operation. In this embodiment, a charger performing the constant power drooping operation is described as a constant power correspondence charger. In the constant power correspondence charger 13, a current drooping operation is performed during the above charge control, and the constant power drooping operation is performed after the charge control. FIG. 10 is a view for explaining the current drooping operation during the charge control and the constant power drooping operation at the end of the charge control in the constant power correspondence charger 13. When the charge control is performed in the DC power supply system 301 having the constant power correspondence charger 13, the following problems may occur.

Figure 7:
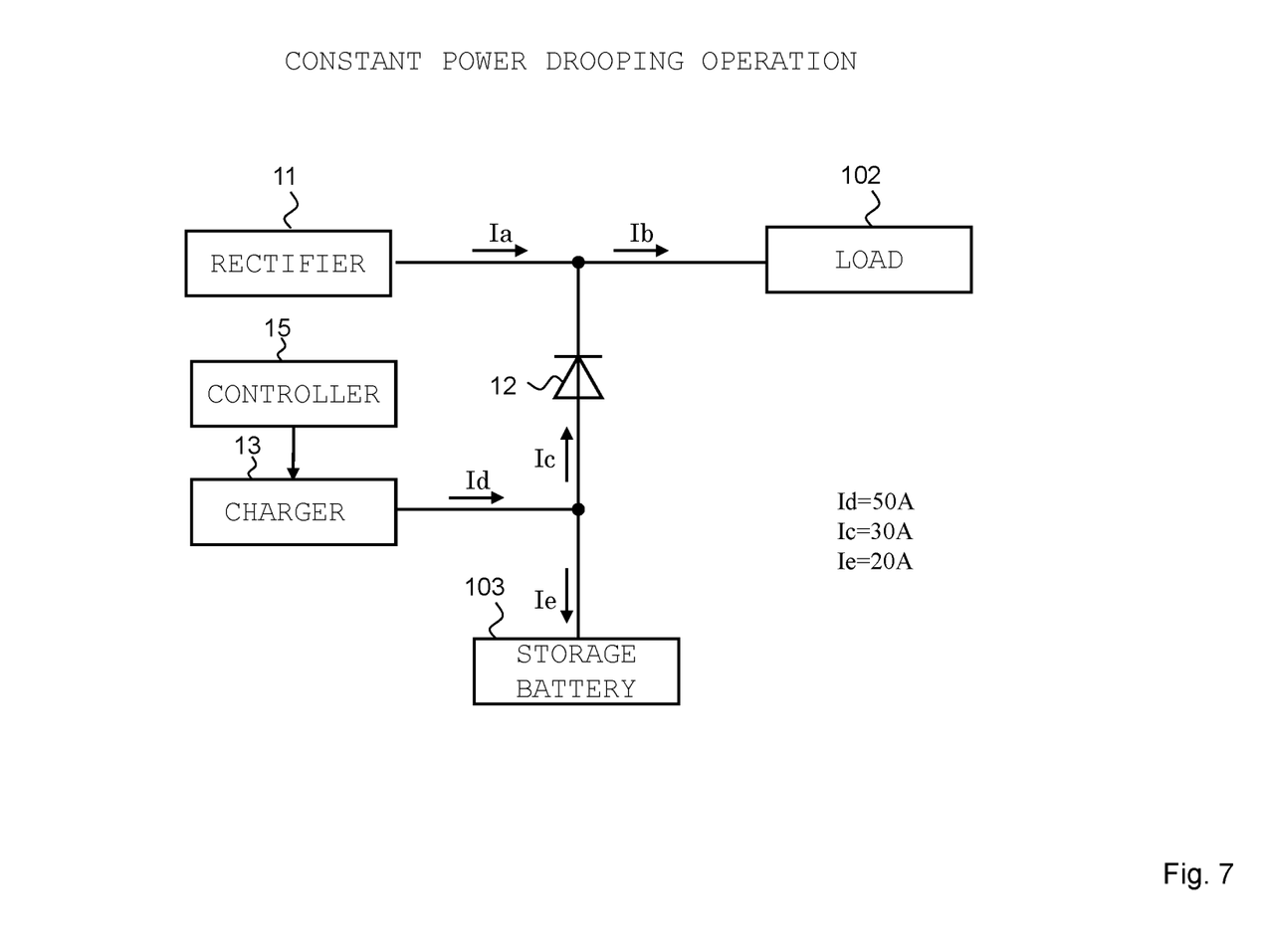
FIG. 7 is a block diagram for explaining the DC power supply system according to the present disclosure.
Figure 8:
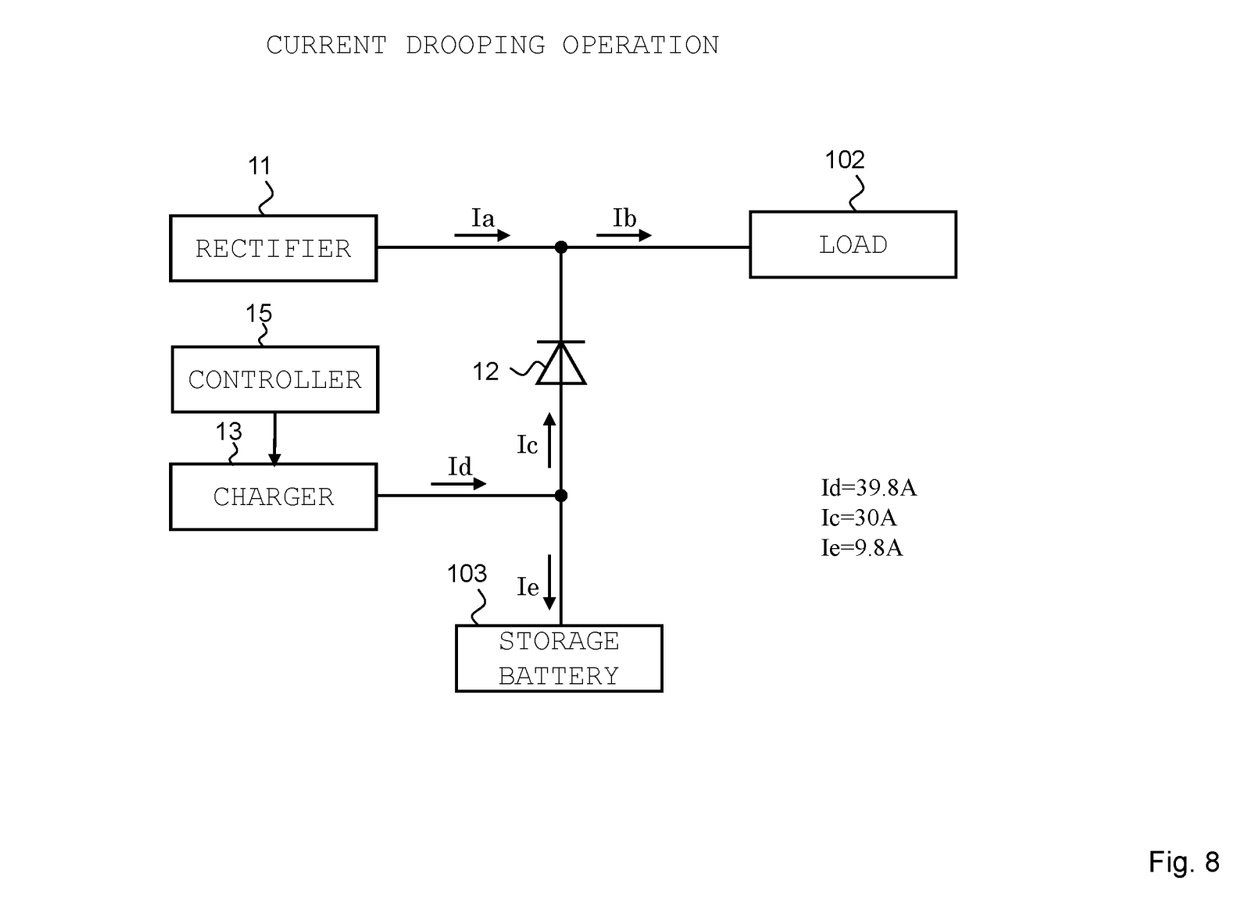
FIG. 8 is a block diagram for explaining the DC power supply system according to the present disclosure.

FIG. 7 is a view for explaining the operation of the DC power supply system 301 when the charge control is not performed. FIG. 8 is a view for explaining the operation of the DC power supply system 301 during the charge control. As specific numerical values, a target charging current (charging current optimum value X) of the storage battery 103 is 15 A, and a rated output current of the constant power correspondence charger 13 is 39.8 A. The constant power correspondence charger 13 supplies the assist current Ic of 30 A to the load 102.

First as in FIG. 7, when the charge control is not performed, the charging current Ie flowing to the storage battery 103 is, for example, 20 A. Since the charging current optimum value X is 15 A, the DC power supply system 301 starts the charge control like the flow described in FIG. 2. In the DC power supply system 301, since the value of the charging current Ie is larger than the charging current optimum value X, the output current setting value Iset is reduced in step S13. And then, the charger output current Id is reduced as described in FIG. 5. FIG. 8 is a view showing a state in which the charge control is performed, the output current setting value Iset is reduced, and the charger output current Id is 39.8 A as the rated output current of the constant power correspondence charger 13. The charging current Ie at this time is 9.8 A.

Since the charging current optimum value X is 15 A, the charge control is performed so that the output current setting value Iset is increased (step S14). When the output current setting value Iset increases, the charger output current Id of the constant power correspondence charger 13 increases and exceeds the rated output current. In this case, it is determined as "No" in step S15, so that the charge control is terminated (step S16).

Thus, in the constant power correspondence charger 13, the constant power drooping operation is performed, and the charging current Ie becomes 20 A again as shown in FIG. 7. When the constant power correspondence charger 13 is thus provided, the DC power supply system 301 repeats the operation of FIGS. 7 and 8, so that the operation may become unstable.

Figure 9:
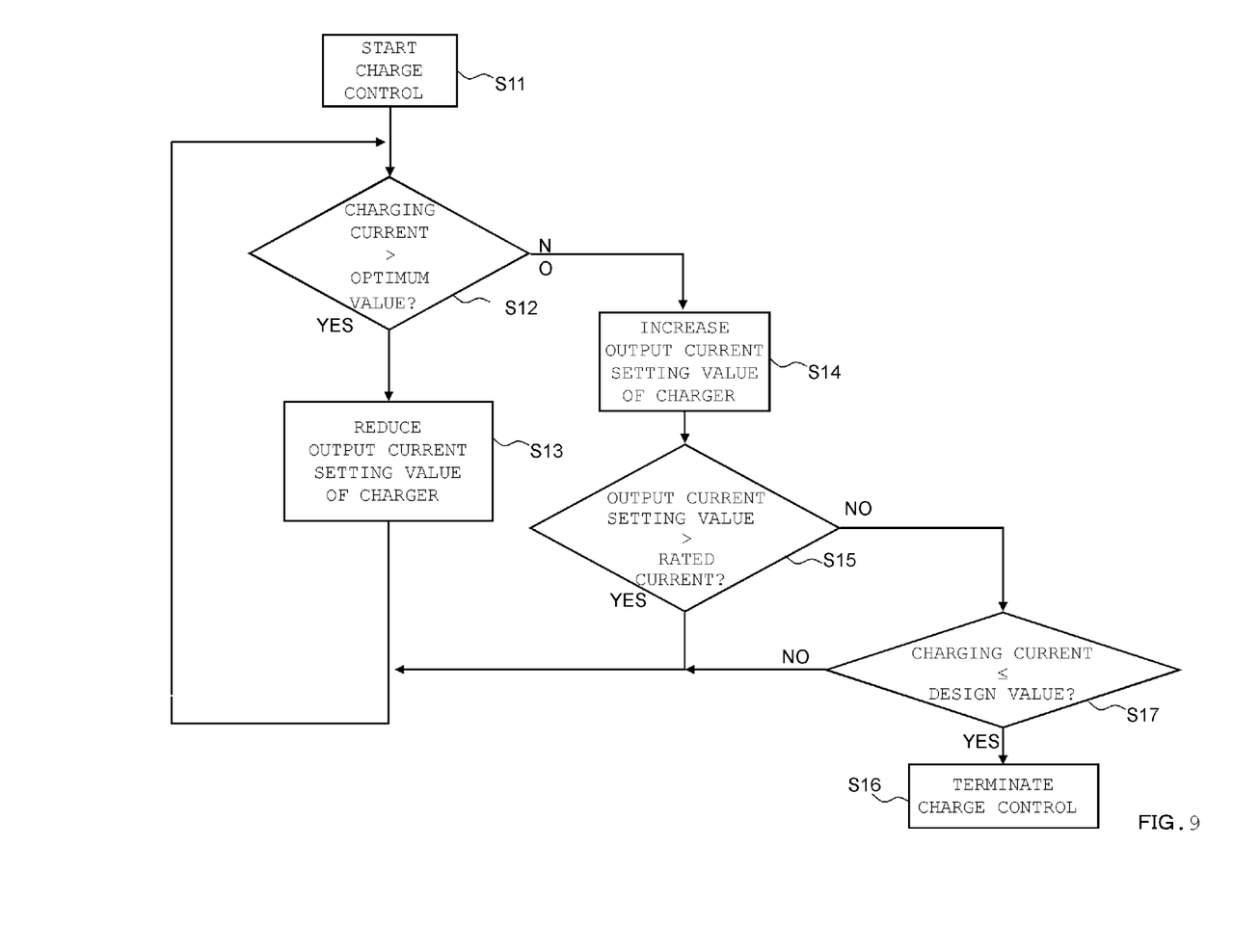
FIG. 9 is a control flow of the charger performed by the DC power supply system according to the disclosure.

Thus, to avoid such an unstable operation, step S17 is performed as shown in FIG. 9 in this embodiment. More specifically, when the output current setting value Iset of the constant power correspondence charger 13 is more than a rated output current of 39.8 A (step S15), it is judged whether the charging current Ie is more than a design value (for example, 5 A) (step S17). When the charging current Ie is more than the design value, the charge control is maintained (flow returns to step S12), and when the charging current Ie is less than the design value, the charge control is terminated (step S16).

The design value as the criterion of step S17 is a value used for judgement whether the storage battery 103 approaches the fully charged state. The design value is smaller than the charging current optimum value X. For example, when the charging current optimum value X is 15 A, the setting value is 5 A which is smaller than this value. When the charging current Ie is less than the design value, the storage battery 103 approaches the fully charged state, and even if the constant power drooping operation is performed after the termination of the charge control, the charging current Ie does not significantly increase, and the charge control is not started again. Accordingly, the charge control to which step S17 is added as shown in FIG. 9 is performed, whereby the DC power supply system 301 having the constant power correspondence charger 13 can avoid unstable operation.

EXPLANATION OF REFERENCE SIGNS

11: Rectifier
12: Diode, semiconductor device
13: Charger
101: AC source
102: Load
103: Storage battery
301: DC power supply system
C1: Drooping curve at output current setting value Iset1
C2: Drooping curve at output current setting value Iset2
Ia: Rectifier output current
Ib: Load current
Ic: Assist current
Id: Charger output current
Ie: Charging current
Iset, Iset1, Iset2: Charger output current setting value
P1, P2: Connecting point
Va: Output voltage
Vd: Charger output voltage
Vset: Charger output voltage setting value
Ve: Terminal voltage
Ve1: Charger output voltage when drooping curve C1 is charging current optimum value X
Ve2: Charger output voltage when drooping curve C2 is charging current optimum value X
W1, W2: Feeder
X: Charging current optimum value
Xs: Current
Z: Rated current value

What is claimed is:

1. A DC power supply system comprising:
   a rectifier that converts AC power from an AC source into DC power and supplies the DC power to a load through a feeder;
   a semiconductor device that connects a storage battery and the feeder to each other and is turned on when a current is supplied from a storage battery side toward a load side;
   a charger that is in parallel with the rectifier, (a) converts the AC power into DC power, (b) charges the storage battery with a charging current of DC, and (c) is controllable to supply an assist current of DC to the load through the semiconductor device; and
   a controller that:
   (a) controls an output current of the charger so that the charging current supplied from the charger to the storage battery is kept at a predetermined value when the charger operates at a potential of an output voltage smaller than a potential of an output voltage of the rectifier during charging of the storage battery, and
   (b) controls the output current of the charger so that the charger outputs the assist current supplied toward the load while the charging current is kept at the predetermined value when the load requires a current larger than the current supplied by the rectifier during charging of the storage battery, the potential of the output voltage of the rectifier is reduced smaller than the potential of the output voltage of the charger by a current drooping operation, and the semiconductor device is turned on.

2. The DC power supply system according to claim 1, wherein the controller controls the output current of the charger so that the charger outputs the assist current when the load requires the current larger than the current supplied by the rectifier when the storage battery is fully charged, the potential of the output voltage of the rectifier is reduced smaller than the potential of the output voltage of the charger by the current drooping operation, and the semiconductor device is turned on.

3. The DC power supply system according to claim 1, wherein the controller activates the charger in a current drooping region and changes an output current setting value of the charger when the output current of the charger is changed by a fluctuation of the output voltage of the charger or an occurrence of the assist current during charging of the storage battery, and thereby controls the output current of the charger so that the charging current is kept at the predetermined value.

4. The DC power supply system according to claim 1, wherein the controller confirms the charging current supplied to the storage battery when the output current setting value of the charger exceeds the upper limit, and terminates the charge control when the charging current is not more than a previously determined design value or continues the charge control when the value of the charging current is more than the design value.

5. The DC power supply system according to claim 1, wherein the controller sets the output current setting value of the charger to a rated current value and allows the charger to wait when the controller terminates the charge control after the storage battery is fully charged.

6. A control method for a DC power supply system including:
   a rectifier that converts AC power from an AC source into DC power and supplies the DC power to a load through a feeder;
   a semiconductor device that connects a storage battery and the feeder to each other and is turned on when a current is supplied from a storage battery side toward a load side; and
   a charger that is in parallel with the rectifier, (a) converts the AC power into DC power, (b) charges the storage battery with a charging current of DC, and (c) is controllable to supply an assist current of DC to the load through the semiconductor device;
   wherein the control method comprises:
   (a) controlling an output current of the charger so that the charging current supplied from the charger to the storage battery is kept at a predetermined value when the charger operates at a potential of an output voltage smaller than a potential of an output voltage of the rectifier during charging of the storage battery; and
   (b) controlling the output current of the charger so that the charger outputs the assist current supplied toward the load while the charging current is kept at the predetermined value when the load requires a current larger than the current supplied by the rectifier during charging of the storage battery, the potential of the output voltage of the rectifier is reduced smaller than the potential of the output voltage of the charger by a current drooping operation, and the semiconductor device is turned on.

7. The control method according to claim 6, further comprising controlling the output current of the charger so that the charger outputs the assist current when the load requires the current larger than the current supplied by the rectifier when the storage battery is fully charged, the potential of the output voltage of the rectifier is reduced smaller than the potential of the output voltage of the charger by the current drooping operation, and the semiconductor device is turned on.

8. The control method according to claim 6, further comprising activating the charger in a current drooping region, and changing an output current setting value of the charger when the output current of the charger is changed by a fluctuation of the output voltage of the charger or an occurrence of the assist current during charging of the storage battery, and thereby controls the output current of the charger so that the charging current is kept at the predetermined value.

9. The control method according to claim 6, further comprising confirming the charging current supplied to the storage battery when the output current setting value of the charger exceeds the upper limit, and terminating the charge control when the charging current is not more than a previously set design value, or continuing the charge control when the charging current is more than the design value.

10. The control method according to claim 6, further comprising setting the output current setting value of the charger to a rated current value and allowing the charger to wait when the charge control is terminated after the storage battery is fully charged.

* * * * *